United States Patent
Shin et al.

(12) 
(10) Patent No.: US 6,198,946 B1
(45) Date of Patent: Mar. 6, 2001

(54) FIRMWARE UPGRADE METHOD FOR WIRELESS COMMUNICATIONS DEVICE, AND METHOD FOR SUPPORTING FIRMWARE UPGRADE BY BASE STATION

(75) Inventors: Seung-Kee Shin, Suwon; Ju-Heon Lee, Seoul, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/196,763

(22) Filed: Nov. 20, 1998

(30) Foreign Application Priority Data

Nov. 20, 1997 (KR) .................................................. 97-61598

(51) Int. Cl.$^7$ .................................................. H04M 3/00
(52) U.S. Cl. .......................... 455/561; 455/418; 455/561
(58) Field of Search .................................. 455/418, 419, 455/572, 561, 573, 556, 557, 38.3, 343

(56) References Cited

U.S. PATENT DOCUMENTS 5,726,636 * 3/1998 Hayes, Jr. ............................ 455/572
5,771,354 * 6/1998 Crawford ......................... 395/200.59
5,854,978 * 12/1998 Heidari .................................. 455/418

* cited by examiner

Primary Examiner—Duc Nguyen
Assistant Examiner—Melur Ramakrishnaiah
(74) Attorney, Agent, or Firm—Robert E. Bushnell, Esq.

(57) ABSTRACT

A method for upgrading firmware (F/W) of a wireless communications device is capable of updating F/W at all times through a simple process by transferring, directly and wirelessly, new firmware required for the wireless communications device from a base station. In the F/W upgrade method, a user's identification of the wireless communications device and information required for F/W upgrade are transferred to the corresponding base station, and the current mode of the wireless communications device is converted into an F/W upgrade mode according to whether or not the corresponding base station allows the upgrade, which is determined based on the transferred information. Then, F/W of the wireless communications device is wirelessly upgraded by the corresponding base station.

25 Claims, 5 Drawing Sheets

FIRMWARE UPGRADE METHOD FOR WIRELESS COMMUNICATIONS DEVICE, AND METHOD FOR SUPPORTING FIRMWARE UPGRADE BY BASE STATION

CLAIM OF PRIORITY

This application makes reference to, incorporates the same herein, and claims all benefits accruing under 35 U.S.C. §119 from an application for FIRMWARE UPGRADE METHOD OF WIRELESS COMMUNICATIONS DEVICE, AND METHOD FOR SUPPORTING FIRMWARE UPGRADE BY BASE STATION earlier filed in the Korean Industrial Property Office on the 20$^{th}$ of November 1997 and there duly assigned Serial No. 61598/1997.

BACKGROUND OF THE INVENTION

Technical Field

The present invention relates to a wireless communications system and, more particularly, to a firmware upgrade method for a wireless communications device, and a method for supporting firmware (F/W) upgrade in a base station.

Related Art

In general, as a user requires the newest function for a cellular phone or for upgrading firmware for a specific reason, the user must personally visit an agent or a repair shop. Upgrading the firmware of a cellular phone is achieved by replacing a chip, and that is why the personal visit is required to the user. However, such a personal visit is very inconvenient for the user. Accordingly, a new method for upgrading firmware without inconvenience is required.

It is noted that U.S. Pat. No. 5,436,955 to Kaewell Jr. et al., discloses a compatible analog channel unit for a digital cellular telephone system. As disclosed therein, an analog channel unit for a digital cellular telephone system services both analog and digital mode subscribers on the same system hardware. All analog system functions required of an analog cellular base station are provided by firmware executed by digital signal processors (DSPs) located in the analog channel unit(s) of the base station. The system operator can, in accordance with the patent remotely reconfigure the channel unit for digital operation by downloading appropriate firmware to the channel unit(s).

Nevertheless, the patent does not relate to or disclose a method for upgrading the firmware of a wireless communication device itself, as disclosed and claimed herein.

SUMMARY OF THE INVENTION

To solve the above problem, it is an object of the present invention to provide a method for upgrading firmware (F/W) of a wireless communications device, thus providing the newest version of F/W at all times through a simple process. The method involves receiving new firmware required for the wireless communications device from a base station directly and wirelessly.

It is another object of the present invention to provide a method for supporting F/W upgrade of a wireless communications device in a base station.

To achieve the first object of the present invention, there is provided an F/W upgrade method for a wireless communications device, comprising the steps of: (a) transferring a user's identification for the wireless communications device, and information required for F/W upgrade, to the corresponding base station; (b) converting the current mode of the wireless communications device into an F/W upgrade mode according to whether or not the corresponding base station allows the upgrade, which is determined based on the transferred information; and (c) upgrading F/W of the wireless communications device wirelessly in the corresponding base station.

To achieve the second object of the present invention, there is provided a method for supporting firmware (F/W) upgrade of a sending station in a base station, comprising the steps of: (a) receiving a pilot signal; (b) identifying a user and F/W upgrade update information for the sending station with respect to the pilot signal; (c) determining whether or not the F/W update is required for the sending station according to the F/W upgrade update information, and transferring the F/W upgrade mode to the sending station if required; and (d) upgrading the F/W of the sending station wirelessly by means of the base station according to whether or not the sending station allows the F/W upgrade mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Together with the introduction of a wireless communications era, many companies providing a wireless communications device compete against each other. Accordingly, good service distinctive from that of other companies is required. In particular, upgrading firmware (F/W) is very important as one of the services.

In order to solve the inconvenience in the conventional method, the present invention provides an F/W upgrade method for a wireless communications device, and a method for supporting the F/W upgrade method in a base station. The F/W upgrade method has the function of previously checking F/W, and automatically upgrading the F/W with the up-to-date version or performing the upgrade after querying the user as to the upgrade of the F/W if the current F/W is not the newest version.

In the F/W upgrade method according to the present invention, upgrading the F/W is performed after a wireless communications device such as a cellular phone, a portable computer or a personal digital assistant (PDA) is turned on and then the corresponding base station receives a pilot signal from a sending station. For the convenience of understanding, a calling method for a general cellular phone and a method of receiving the call in a base station will be described briefly.

Figure 1:
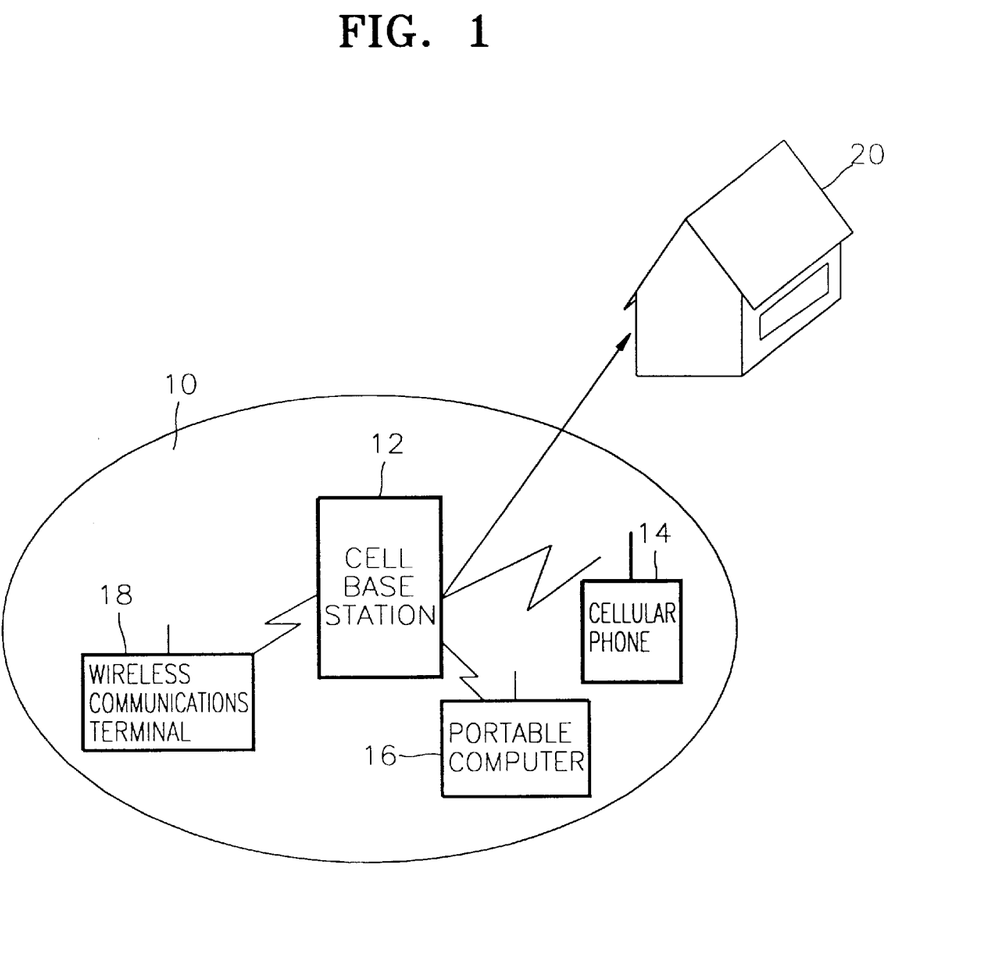
FIG. 1 shows the relationship between a cell base station and a mobile station within a cell or coverage area.

FIG. 1 is a diagram showing the relationship between a cell base station and a mobile station within a cell or coverage area. In FIG. 1, reference numeral 10 represents a cell or coverage area, reference numeral 12 represents a cell base station, reference numeral 14 represents a cellular phone, reference numeral 16 represents a portable computer, reference numeral 18 represents another wireless communications terminal, and reference numeral 20 represents a call site. Referring to FIG. 1, when the cellular phone 14 is turned on, the cellular phone 14 simultaneously sends its identification (ID) to the cell base station 12. Accordingly, when called from a remote site, that is, from the call site 16, the cell base station 12 memorizes the last location where the cellular phone 14 has been used, and finds the location of the cellular phone 14 to connect the cellular phone 14 to the call site 20 in the fastest way.

Figure 2:
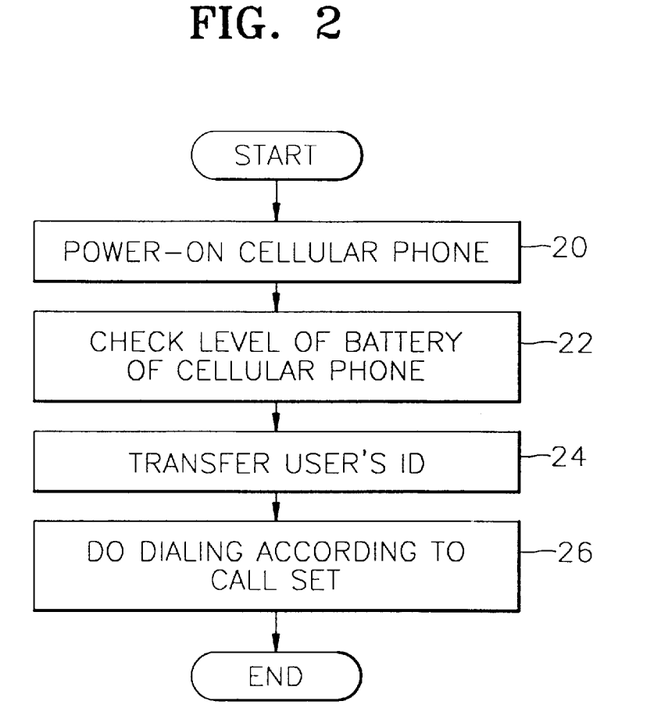
FIG. 2 is a flowchart illustrating a calling method for a cellular phone.

FIG. 2 is a flowchart illustrating a calling method in a mobile station. First, the power of a cellular phone is turned on in step 20, and an initialization operation for checking the level of the battery of the cellular phone is performed in step 22. A user's ID for the cellular phone is transferred to the corresponding cell base station in step 24. Dialing is performed in response to the call set from the cell base station in step 26.

Figure 3:
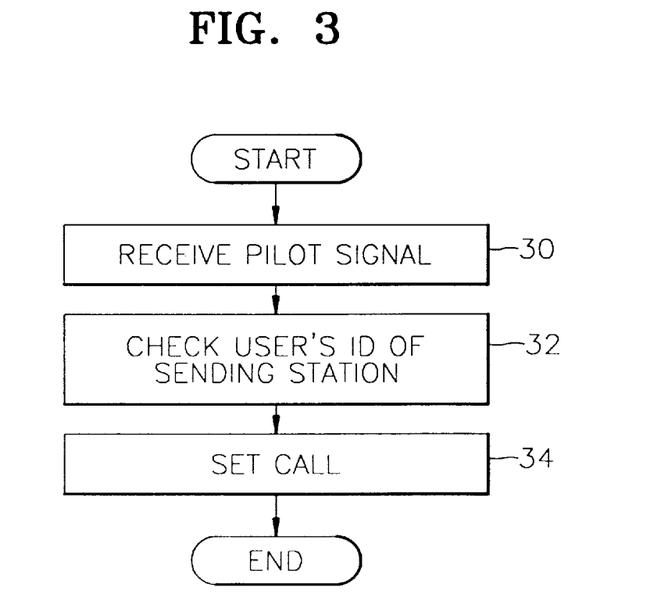
FIG. 3 is a flowchart illustrating a method for receiving a call in the cell base station in response to a calling cellular phone.

FIG. 3 is a flowchart illustrating a method for receiving a call at a base station. In FIG. 3, a pilot signal is received in the corresponding cell or coverage area in step 30. The sending station corresponding to the received pilot signal, that is, the user's ID for the cellular phone 12, is identified in step 32. After such identification, a calling condition is established or set to allow the sending station to perform dialing in step 34.

Figure 4:
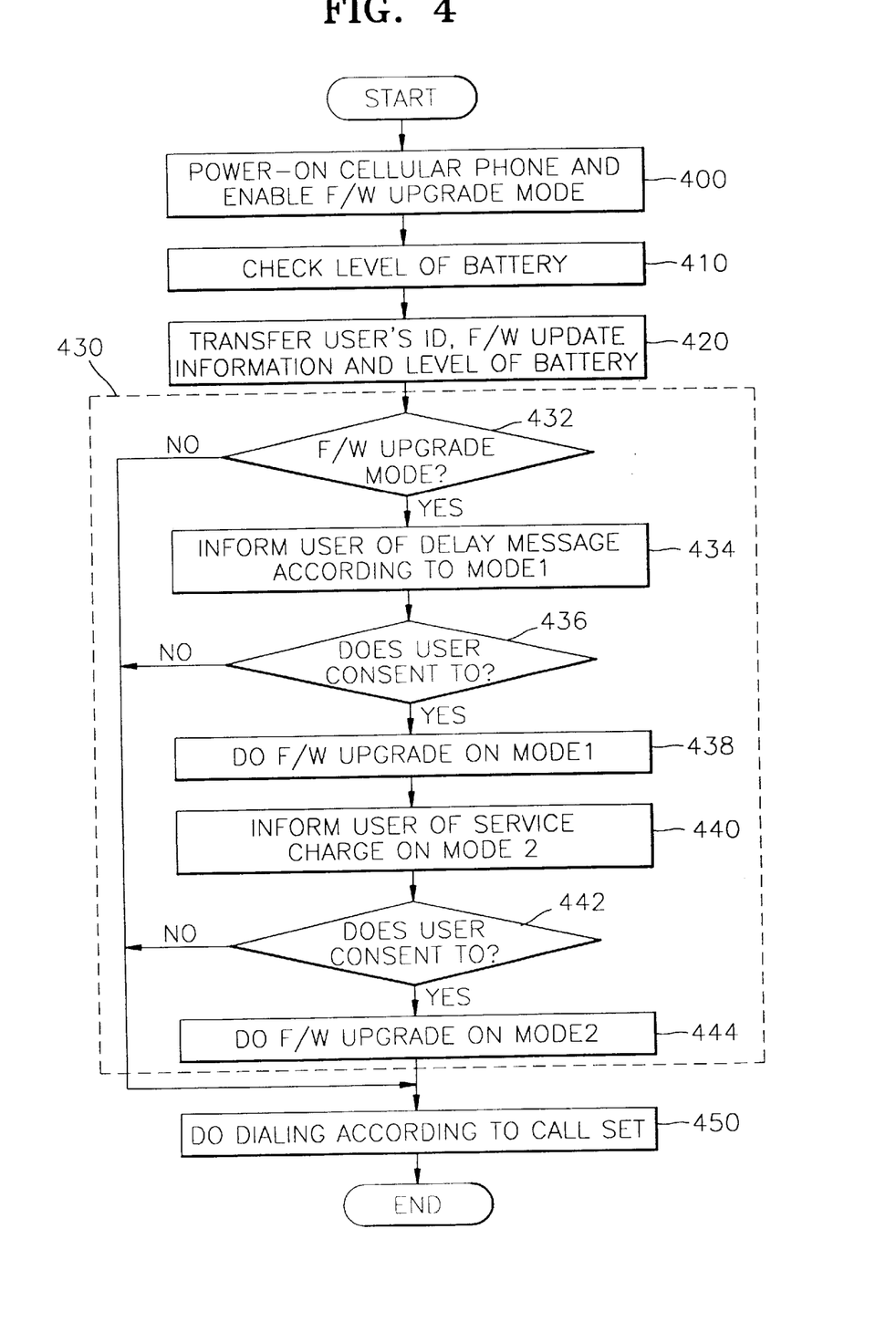
FIG. 4 is a flowchart illustrating a method for upgrading firmware (F/W) of a wireless communications device according to a first embodiment of the present invention.
Figure 5:
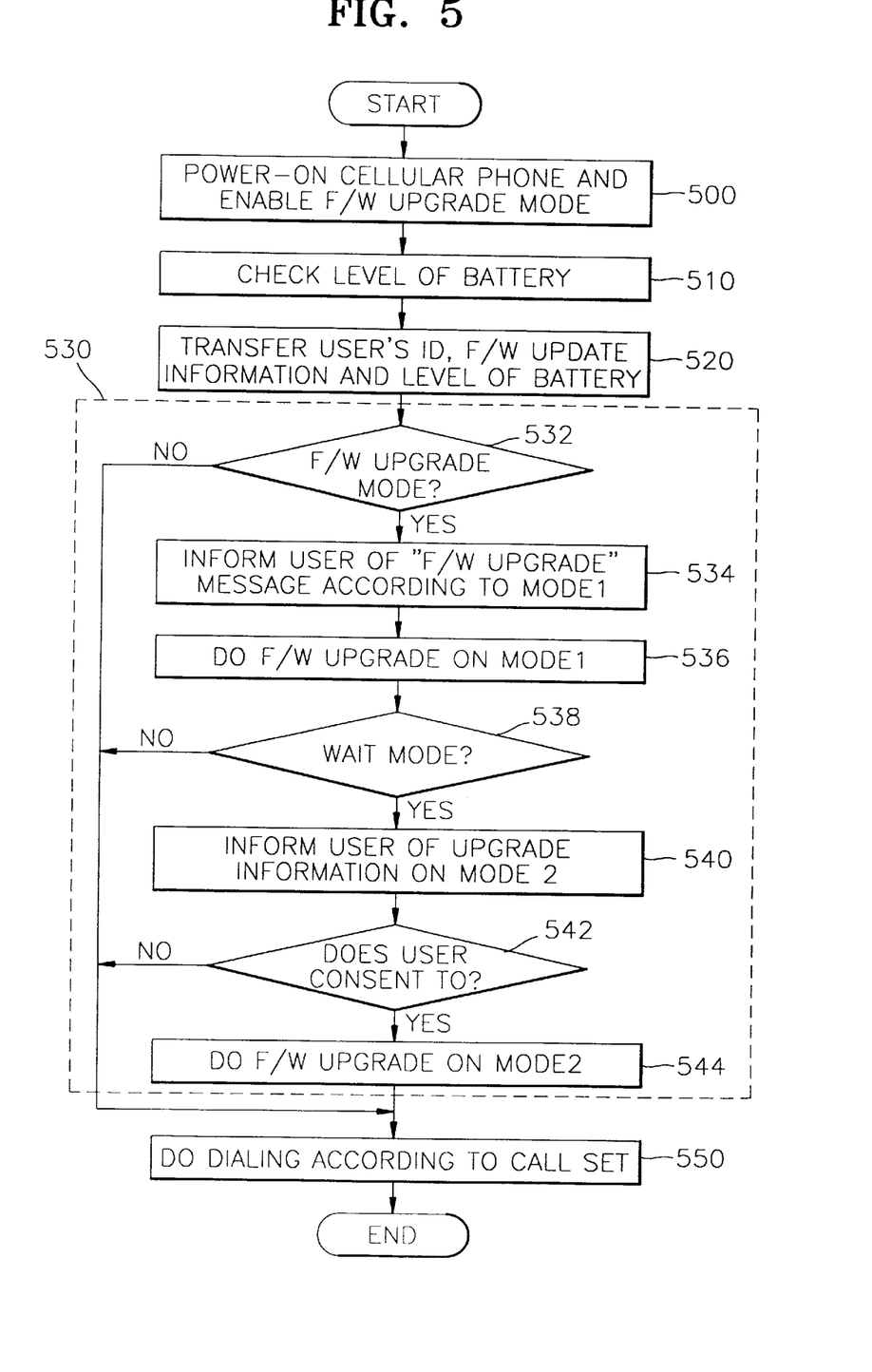
FIG. 5 is a flowchart illustrating a method for upgrading F/W of a wireless communications device according to a second embodiment of the present invention.

Instead of the procedures shown in the flowcharts of FIGS. 2 and 3, the present invention provides protocols between a cellular phone and a corresponding base station for wireless communication, as shown in the flowcharts of FIGS. 4 and 5.

Hereinafter, a method for upgrading F/W of a wireless communications device, and a method for supporting F/W upgrade in a base station according to the present invention, will be described with reference to the appended drawings.

FIG. 4 is a flowchart illustrating a method for upgrading F/W of a wireless communications device according to a first embodiment of the present invention. While the F/W upgrade method of the present invention is described with reference to a cellular phone, the method of the present invention may be applied to other wireless communications devices.

First, the power of a cellular phone is turned on, or if the power of the cellular phone is already on, then a F/W upgrade mode of the cellular phone is enabled in step 400. The F/W upgrade method according to the present invention is performed before the wireless communications device enters a normal mode of operation after being turned on. Alternatively, the F/W upgrade may be performed when the cellular phone is set to an F/W upgrade mode from a normal mode by a user or the corresponding base station.

Next, initialization and checking of the level of the battery of the cellular phone is performed in step 410. A user's ID and information required for upgrading F/W are transferred in step 420. Such upgrade information includes the minimum information for upgrading F/W (i.e., information for checking whether or not the F/W is the up-to-date version, and information about the level of battery). In comparison with step 24 of FIG. 2, additional information other than the user's ID is transferred.

Next, the cellular phone determines whether or not the corresponding base station will allow the upgrade according to the transferred information, and the mode of the cellular phone is switched to the F/W upgrade mode. Then, the F/W of the wireless communications device is wirelessly upgraded through a predetermined number of detailed processes in step 430.

The step 430 includes the following sub-steps.

A determination as to whether or not the mode of the cellular phone can be switched to the F/W upgrade mode according to the direction of the corresponding base station is made in step 432. If the mode of the cellular phone is not able to be switched to the F/W upgrade mode, dialing is possible according to the call set from the base station while the cellular phone is in the normal mode in step 450.

If the mode of the cellular phone is determined to be the F/W upgrade mode in step 432, a delay message indicating that use of the cellular phone is delayed in the F/W upgrade mode is output to an output device, such as a speaker or a display screen, in Mode 1 in step 434. Then, it is determined in step 436 whether or not the user will allow such a delay in the use of the cellular phone.

If the user permits the delayed use of the cellular phone, the F/W is upgraded in step 438. Otherwise, the F/W upgrade mode is switched to the normal mode to allow general dialing according to the call set from the base station in step 450. Mode 1 is a basic mode for the F/W upgrade, provided by the corresponding base station without payment, or from a manufacturer of the cellular phone or a network service company if required.

In addition, a service charge for the F/W upgrade is reported to the user in Mode 2 via the output device in step 440. Then, a determination as to whether or not the user consents to the service charge is made in step 442.

If the user consents to the service charge in step 442, another F/W is upgraded in step 444. Otherwise, the F/W upgrade mode is switched to the normal mode of the cellular phone to allow general calling according to the call set from the base station in step 450. Mode 2 is an additional F/W upgrade mode provided for a service charge or fee by the corresponding base station of the cellular phone or by a user if required.

When the F/W is upgraded in the detailed modes described above, the F/W upgrade mode is switched to the normal mode to allow general calling according to the call set from the base station in step 450.

In the method for upgrading F/W of a wireless communications device according to the first embodiment of the present invention, illustrated with reference to FIG. 4, permission of the user for the upgrade is required regardless of the mode if the current F/W is not the newest version. Alternatively, if the current F/W is not the up-tp-date version, the F/W upgrade may be performed automatically or after the user permits the upgrade.

FIG. 5 is a flowchart illustrating a method for upgrading F/W of a wireless communications device according to a second embodiment of the present invention. The F/W upgrade method of FIG. 5 relates to a cellular phone as in the first embodiment. However, the F/W upgrade method may be applied to another wireless communications device. Steps 500, 510 and 520 of FIG. 5 are for the same operations as in the steps 400, 410 and 420 of FIG. 4, and thus illustration thereof is omitted.

After step 520, the mode of the cellular phone is switched to an F/W upgrade mode according to whether or not the corresponding base station allows the upgrade based on the transferred information, and then the F/W of the wireless communications device is wirelessly upgraded through a predetermined number of detailed modes or processes in step 530.

The step 530 includes the following sub-steps.

A determination as to whether or not the mode of the cellular phone is switched to the F/W upgrade mode according to the direction of the corresponding base station is made in step 532. If the mode of the cellular phone is not switched to the F/W upgrade mode, dialing is possible according to the call site from the base station while the cellular phone is in the normal mode in step 550.

If the mode of the cellular phone is determined to be the F/W upgrade mode in step 532, an F/W upgrade message is output to an output device, such as a speaker or a display screen, in Mode 1 in step 534. Then, F/W upgrade according to Mode 1 is performed in step 536. Mode 1 is a mode for performing a basic F/W upgrade provided by a manufacturer of the cellular phone or a network management company without the consent of the user.

Next, it is determined in step 538 whether or not the cellular phone is still in a wait mode before being switched to a normal mode. If the user has switched the mode to the normal mode, step 550 is performed. If it is determined that the user has held the wait mode in step 538, minimal upgrade information (such as the requirement for another F/W upgrade or a service charge for the F/W upgrade) is reported to the user according to Mode 2 in step 540. Then, a determination as to whether or not the user consents to the upgrade information is made in step 542.

If the user consents to the upgrade information in step 542, the F/W upgrade is performed in step 544. If the user does not consent to the upgrade information, the mode of the cellular phone is switched to the normal mode to allow general dialing according to the call set from the base station in step 550. Mode 2 is a mode for another F/W upgrade, provided by a manufacturer of the cellular phone or a network management company according to the consent of the user.

The FlW is upgraded in the above-described detailed processes, and the F/W upgrade mode is switched to the normal mode to allow general dialing according to the call set from the base station in step 550.

Figure 6:
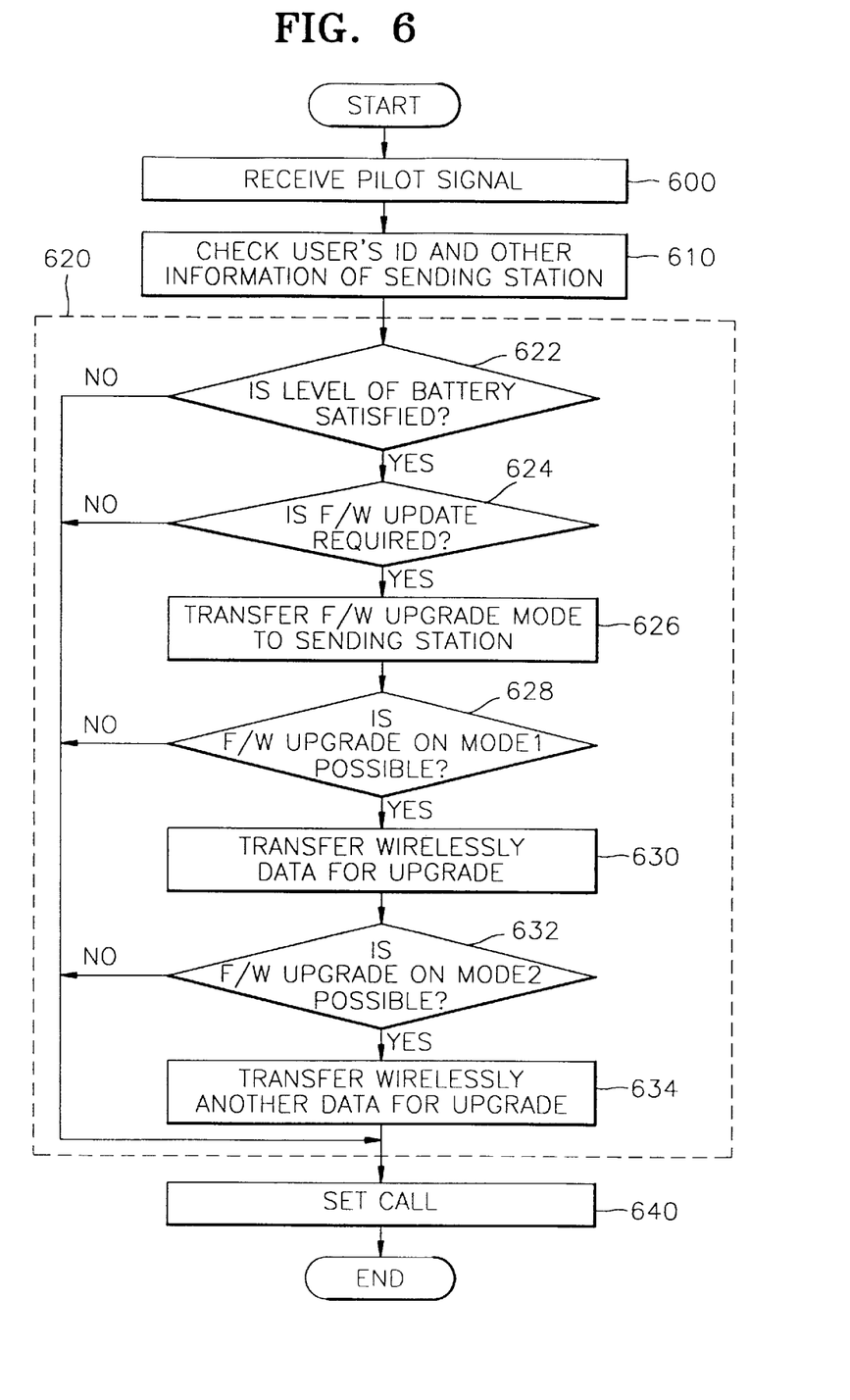
FIG. 6 is a flowchart illustrating a method for supporting F/W upgrade by a base station according to the present invention.

FIG. 6 is a flowchart illustrating a method for supporting F/W upgrade in a base station according to the present invention.

First, a pilot signal is received within the corresponding effective area of coverage in step 600. Support for the F/W upgrade by the base station is performed in the early stage after receiving the pilot signal from a sending station. Such support for the F/W upgrade may be performed when the sending station or the base station requires the F/W upgrade.

Then, the user of the sending station is identified based on the pilot signal, and F/W upgrade information of the sending station and the level of the battery are checked in step 610.

A determination as to whether or not the sending station requires F/W update is made according to the F/W upgrade information. If required, the mode of the sending station is switched to the F/W upgrade mode, and the F/W of the sending station is wirelessly upgraded according to whether or not the sending station allows the upgrade according to a predetermined number of detailed processes, in step 620.

Step 620 includes the following sub-steps.

A determination as to whether or not the level of the battery in the sending station satisfies the above predetermined level is made in step 622. If the condition of step 622 is satisfied, the next step is performed for the F/W upgrade. Otherwise, calling is set to allow the general dialing of the sending station in step 640, stopping the operation for the F/W upgrade. The term "predetermined level of the battery" means a level sufficient for the sending station to be upgraded in F/W. That is, if the level of the battery of the sending station is low, F/W upgrade is impossible.

Next, a determination as to whether updating the F/W upgrade is necessary based on the F/W upgrade information of the sending station is made in step 624. That is, if the current version is determined as an old version from the update information, an F/W update mode is transferred to the sending station. If the current version is a new version, calling is set to allow the sending station to do general dialing in step 640, instead of doing the F/W upgrade operation.

The base station transfers mode conversion data to the sending station, in step 626, in order to convert the mode of the sending station to the F/W upgrade mode. Then, a determination as to whether or not the sending station can allow the F/W upgrade according to the Mode 1 is made in step 628. If the sending station allows the F/W upgrade, data for the F/W upgrade is wirelessly transferred in step 630. Here, the data for F/W upgrade is provided by the base station without payment, or by a manufacturer of the sending station or a network management company if required.

Also, a determination as to whether or not the sending station allows the F/W upgrade in Mode 2 is made in step 632. If the sending station allows the F/W upgrade in Mode 2, data for the F/W upgrade according to Mode 2 is transferred in step 634. The data for the F/W upgrade in Mode 2 is provided for a charge or fee by the base station, or by the base station according to the needs of the sending station. If the sending station does not allow the F/W upgrade in Mode 2, the above-described step 640 is performed.

If the upgrade in the described detailed processes is completed, a call is set to allow the sending station to do general dialing in step 640.

The F/W upgrade methods, and the method for supporting the upgrade, according to the present invention have been described. Modes 1 and 2, which are detailed modes set for use when a wireless communications device is switched to the F/W upgrade mode, are classified depending on the service charge, or the need for the user's permission to perform the upgrade. That is, a mode for informing a user of the service charge, and a mode for asking a user for permission to perform an upgrade whenever a new specification for the terminal is developed, are provided to the user. While these modes have been illustrated, another mode may be further provided if required. For example, a mode for reporting whether the wireless communications device in use is out of date, or whether the wireless communications device in use inherently cannot allow the F/W upgrade, may be added.

Also, the F/W upgrade methods and the method for supplying the upgrade according to the present invention may be performed with a mutual relationship or independently. That is, it is not necessary to provide the support method illustrated in FIG. 6 together with the upgrade method illustrated with reference to FIG. 4 or 5. The upgrade method shown in FIG. 4 or 5 may be supported by another upgrade support method, and vice versa.

As described above, in the F/W upgrade method for a wireless communications device, and the method for supporting the F/W upgrade in a base station according to the present invention, the F/W upgrade is wirelessly performed, thereby reducing the time required for developing and mass-producing the wireless communications device. Accordingly, competitiveness in the market can be secured. Also, costs and labor required can be sharply reduced by providing before-service or after-service when the function of the wireless communications device changes.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A firmware (F/W) upgrade method for a wireless communications device, comprising the steps of:
    (a) transferring an identification of a user of the wireless communications device, and information required for an F/W upgrade, to a corresponding base station;
    (b) converting a current mode of the wireless communications device into an F/W upgrade mode according to whether the corresponding base station allows the F/W upgrade, which is determined based on the transferred information; and
    (c) upgrading an F/W of the wireless communications device wirelessly by means of the corresponding base station;
    wherein the information required for the F/W upgrade includes at least F/W update information and information about a level of a battery of the wireless communications device and wherein step (b) is performed only when the level of the battery is above a predetermined level.

2. The method of claim 1, wherein step (c) comprises the sub-steps of:
    (c1) reporting a delay message, indicating a delay in use of the wireless communications device in the F/W upgrade mode, to the user from the corresponding base station; and
    (c2) performing the F/W upgrade in the F/W upgrade mode;
    wherein the F/W upgrade mode is provided by at least one of the corresponding base station without payment, a manufacturer of the wireless communications device, and a network management company as required.

3. The method of claim 1, wherein step (c) comprises the sub-steps of:
    (c1) reporting a service charge, required for receiving the F/W upgrade, to the user from the corresponding base station; and
    (c2) determining whether the user consents to the service charge, and performing the F/W upgrade when the user consents to the service charge;
    wherein the F/W upgrade mode is provided for the service charge by the corresponding base station according to the need of the user.

4. The method of claim 1, wherein steps (a) thru (c) are performed before the wireless communications device is switched to a normal mode after power to the wireless communications device is turned on.

5. The method of claim 1, wherein step (a) thru (c) are performed as the wireless communications device is placed in the F/W upgrade mode from the normal mode by one of the user and the corresponding base station.

6. A method for supporting firmware (F/W) upgrade for a sending station by a base station, comprising the steps of:
    (a) receiving a pilot signal;
    (b) identifying a user and F/W upgrade update information of the sending station with respect to the pilot signal;
    (c) determining whether the F/W upgrade is required for the sending station according to the F/W upgrade update information, and switching the sending station into one of two F/W upgrade modes as required; and
    (d) upgrading the F/W of the sending station wirelessly by means of the base station according to whether the sending station allows said one of the two F/W upgrade modes; and
    wherein said two F/W upgrade modes comprise a first upgrade mode for upgrading the F/W of the sending station on a no-charge basis and a second upgrade mode for upgrading the F/W of the sending station on a charge basis.

7. The method of claim 6, wherein step (b) comprises the step (b1) of checking a level of a battery of the sending station, and wherein step (c) is performed when the level of the battery satisfies a predetermined level, and wherein the predetermined level is a level sufficient for the sending station to be subjected to the F/W upgrade.

8. The method of claim 6, wherein step (d) comprises the step of determining whether the sending station allows the first upgrade mode and transferring data for the F/W upgrade wirelessly when the sending station consents to the first upgrade mode.

9. The method of claim 8, wherein the data for the F/W upgrade is provided by the base station without payment by the sending station in the first upgrade mode.

10. The method of claim 8, wherein the data for the F/W upgrade is provided according to the requirement of one of a manufacturer of the station and a network management company.

11. The method of claim 6, wherein step (d) comprises the step of determining whether the sending station allows the second upgrade mode and transferring data for the F/W upgrade wirelessly.

12. The method of claim 11, wherein the data for F/W upgrade is provided by the base station for a service charge paid by the sending station.

13. The method of claim 11, wherein the data for the F/W upgrade is provided according to the requirement of the sending station.

14. The method of claim 6, wherein steps (a) thru (d) are performed in an early stage after receiving the pilot signal from the sending station.

15. The method of claim 6, wherein steps (a) thru (d) are performed when one of the sending station and the base station requires the F/W upgrade.

16. A method of upgrading firmware (F/W) of a wireless communication device in a system which includes a base station, comprising the steps of:
    (a) enabling an F/W upgrade mode of the wireless communication device;
    (b) transferring upgrade information from the wireless communication device to the base station;

(c) determining at the wireless communication device whether the base station will allow an F/W upgrade;

(d) switching the wireless communication device to an F/W upgrade mode when it is determined in step (c) that the base station will allow the F/W upgrade; and (e) wirelessly upgrading the F/W of the wireless communication device;

wherein step (d) comprises switching the wireless communication device to one of a first F/W upgrade mode wherein the F/W upgrade is at no monetary charge to the wireless communication device and a second F/W upgrade mode wherein the F/W upgrade is at a monetary charge to the wireless communication device; and wherein step (e) comprises the sub-steps of:

(e1) reporting a service charges required for receiving the F/W upgrade, to the user from the base station; and (e2) determining whether the user consents to the service charge, and performing the F/W upgrade in the second F/W upgrade mode when the user consents to the service charge.

17. The method of claim 16, wherein step (b) comprises transferring a user identification of the wireless communication device and information required for the F/W upgrade to the base station.

18. The method of claim 17, wherein the information required for the F/W upgrade includes at least F/W update information and information about a level of a battery of the wireless communication device.

19. The method of claim 16, wherein step (e) comprises the sub-steps of:

(e1) reporting a delay message, indicating a delay in use of the wireless communication device in the F/W upgrade mode, to the user from the base station; and (e2) performing an upgrade mode;

wherein the upgrade mode is provided by at least one of the base station, a manufacturer of the wireless communication device, and a network management company.

20. The method of claim 16, wherein step (a) is performed before the wireless communication device is switched to a normal mode after power of the wireless communication device is turned on.

21. The method of claim 16, wherein step (a) comprises switching the wireless communication device from a normal mode to the F/W upgrade mode by one of the user and the base station.

22. The method of claim 16, wherein step (e) comprises the sub-steps of:

(e1) reporting an F/W upgrade message to the user; and (e2) performing the F/W upgrade in accordance with one of the first and second F/W upgrade modes.

23. The method of claim 22, wherein step (e) further comprises the sub-steps of:

(e3) determining whether there is a wait mode; and (e4) when there is await mode, informing the user of upgrade information as to upgrading in the second F/W upgrade mode.

24. The method of claim 23, wherein step (e) further comprises the sub-steps of:

(e5) determining whether the user consents to the F/W upgrade in accordance with the second F/W up(rade mode; and (e6) when the user consents to the F/W upgrade in accordance with the second F/W upgrade mode, performing the F/W upgrade in accordance with the second F/W upgrade mode.

25. The method of claim 22, wherein step (e) further comprises the sub-steps of:

(e3) determining whether the user consents to the F/W upgrade in accordance with the second F/W upgrade mode; and (e4) when the user consents to the F/W upgrade in accordance with the second F/W upgrade mode, performing the F/W upgrade in accordance with the second F/W upgrade mode.

* * * * *